T. L. BURTON.
FOUNDATION BRAKE RIGGING.
APPLICATION FILED JUNE 1, 1914.
1,166,180.
Patented Dec. 28, 1915.
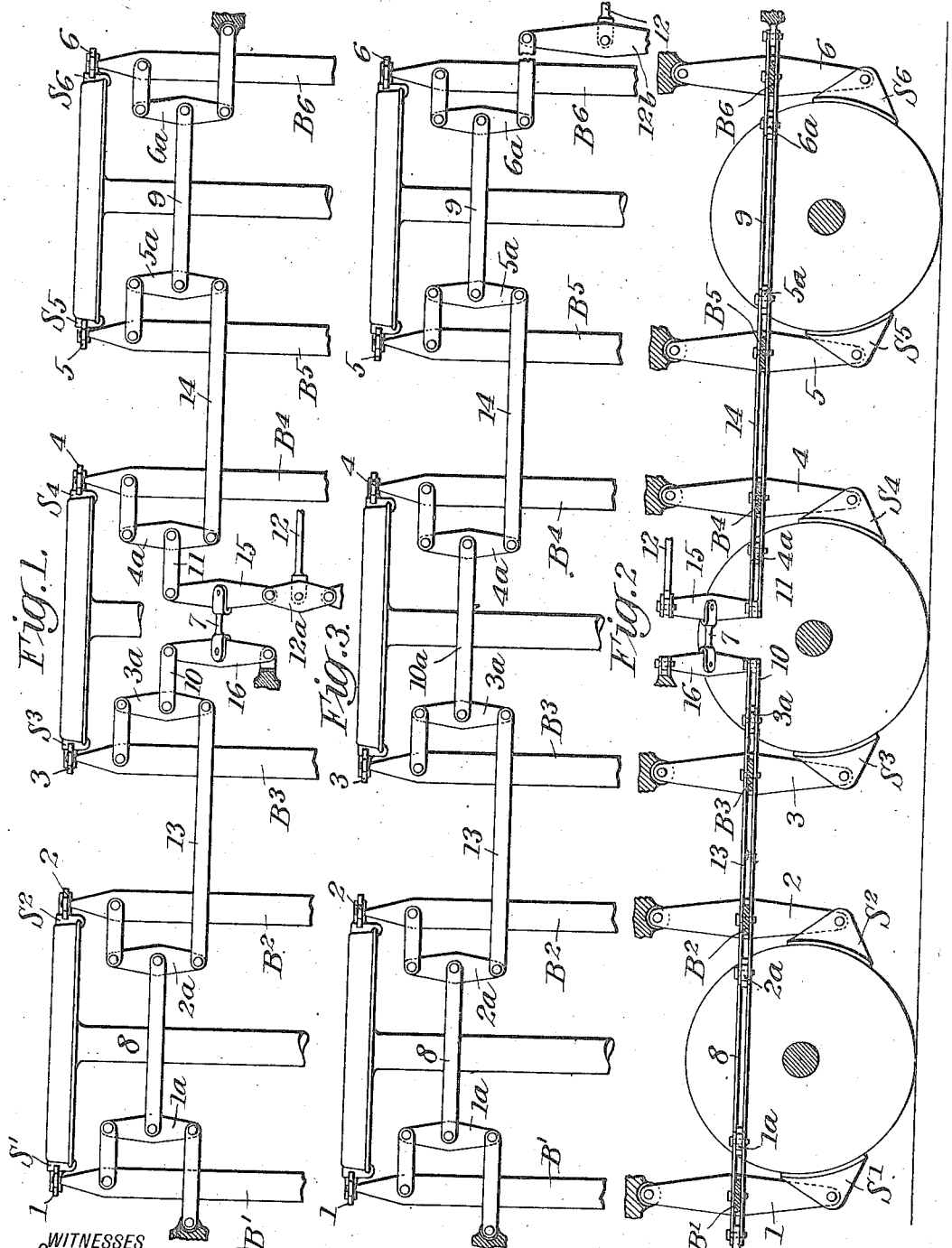

UNITED STATES PATENT OFFICE.

THOMAS L. BURTON, OF PITTSBURGH, PENNSYLVANIA, ASSIGNOR TO AMERICAN BRAKE COMPANY, OF ST. LOUIS, MISSOURI, A CORPORATION OF MISSOURI.

FOUNDATION BRAKE-RIGGING.

1,166,180.　　　　Specification of Letters Patent.　　Patented Dec. 28, 1915.

Application filed June 1, 1914.　Serial No. 841,992.

*To all whom it may concern:*

Be it known that I, THOMAS L. BURTON, a citizen of the United States, and a resident of Pittsburgh, in the county of Allegheny and State of Pennsylvania, have invented a certain new and useful Improvement in Foundation Brake-Rigging, of which improvement the following is a specification.

This invention relates to foundation brake rigging for pivoted railway trucks, and more particularly to the clasp type of brake in which brake shoes are applied to both sides of each pair of wheels, the object of my invention being to provide an improved brake construction of this type in which a brake hanger lever having a fixed fulcrum is provided for each brake head, the corresponding hanger levers on opposite sides of the truck being connected by transverse brake beams which are operated by the truck levers.

In the accompanying drawings: Figure 1 is a half plan of one form of clasp type brake rigging embodying my improvement; Fig. 2, a longitudinal sectional view of the same, showing one set of truck levers and rods in elevation; and Fig. 3, a view similar to Fig. 1, but showing a modification in which the power is applied at the end of the truck.

According to the construction shown in the drawing, my improvement is illustrated in connection with a six wheeled truck having brake heads, such as $S^1$, $S^2$, $S^3$, $S^4$, $S^5$ and $S^6$, applied to both sides of each wheel, the heads being pivoted directly to the lower ends of the respective hanger levers 1, 2, 3, 4, 5, and 6, on each side of the truck, and the hanger levers having fixed fulcrums at their upper ends. The corresponding hangers upon opposite sides of the truck are connected by the respective transverse brake beams, $B^1$, $B^2$, $B^3$, $B^4$, $B^5$ and $B^6$, which are connected to said hanger levers at an intermediate point. For operating said brake beams, I provide one or two sets of truck levers and rods, preferably two sets, one on each side of the truck, the truck levers being pivotally connected at one end to said beams and connected to suitable pull rods at the opposite ends.

As shown in Figs. 1 and 2 of the drawings, the respective truck levers, $1^a$, $2^a$, $3^a$, $4^a$, $5^a$, and $6^a$, are pivotally connected at one end by means of links with the respective brake beams, the outer pairs of truck levers, $1^a$, $2^a$, and $5^a$, $6^a$, being connected by the respective pull rods, 8 and 9, while the ends of the truck levers, $2^a$ and $3^a$, are connected by rod, 13, and the ends of levers, $4^a$ and $5^a$, by rod, 14. The live truck levers, $3^a$ and $4^a$, of the center pair of wheels are operated by the intermediate levers, 16 and 15, joined by rod, 7, and connected to said truck levers by the respective links, 10 and 11. Where two similar sets of intermediate levers, truck levers and rod connections are provided, one on each side of the truck, both sets are actuated by the equalizer, $12^a$, and the brake rod, 12, from the brake cylinder, as will be readily understood. With this form of rigging, the braking stresses are transmitted from the intermediate levers at the center of the truck through the connected rods, and truck levers, to the levers $1^a$ and $6^a$, which have fixed fulcrums at the ends of the truck.

In the modification shown in Fig. 3, the power is applied to the rigging at the end of the truck by means of rod, 12, equalizer, $12^b$, and attached links connected to the ends of the truck levers, $6^a$, and in this case the live truck levers, $3^a$ and $4^a$, of the center pair of wheels are directly connected by means of the pull rod, $10^a$. With this construction the stresses are transmitted from the live end truck lever, $6^a$, through the set of rods and levers successively to the dead truck lever, $1^a$, having the fixed fulcrum at the other end of the truck. The truck levers and rods may, if desired, be located in substantially the same horizontal plane with the brake beams, and the rods and links may be formed double with one member above and the other below the levers and beams, as shown in the drawing.

With the construction as above described, the hanger levers support the entire rigging, and as the brake heads are pivoted on the hangers independently of the brake beams, the heads may be readily detached by simply removing the pin for repairs or renewals at any time without disturbing or disconnecting other parts of the rigging.

Having now described my invention, what I claim as new and desire to secure by Letters Patent is:

1. In a brake rigging for railway trucks having a plurality of pairs of wheels, the combination of brake heads applied to both sides of each pair of wheels, hanger levers pivoted at their lower ends to the brake heads and having fixed fulcrums at the upper ends, transverse brake beams connecting corresponding hanger levers at their intermediate portions, and truck levers and rods for operating said brake beams.

2. In a brake rigging for railway trucks having a plurality of pairs of wheels, the combination of brake heads applied to both sides of each pair of wheels, hanger levers having fixed fulcrums at their upper ends and pivoted to said heads at their lower ends, transverse brake beams connecting corresponding hanger levers on opposite sides of the truck, and a set of connected truck levers and rods on each side of the truck for operating said brake beams.

3. In a brake rigging for railway trucks having a plurality of pairs of wheels, the combination of brake heads applied to both sides of each pair of wheels, hanger levers pivoted at their lower ends to the brake heads and having fixed fulcrums at the upper ends, transverse brake beams connecting corresponding hanger levers at their intermediate portions, and a horizontal system of truck levers and rods upon each side of the truck and in substantially the same plane with said brake beams for actuating the same.

In testimony whereof I have hereunto set my hand.

THOMAS L. BURTON.

Witnesses:
 F. G. CRAIG,
 C. C. ZIEGLER.